ps

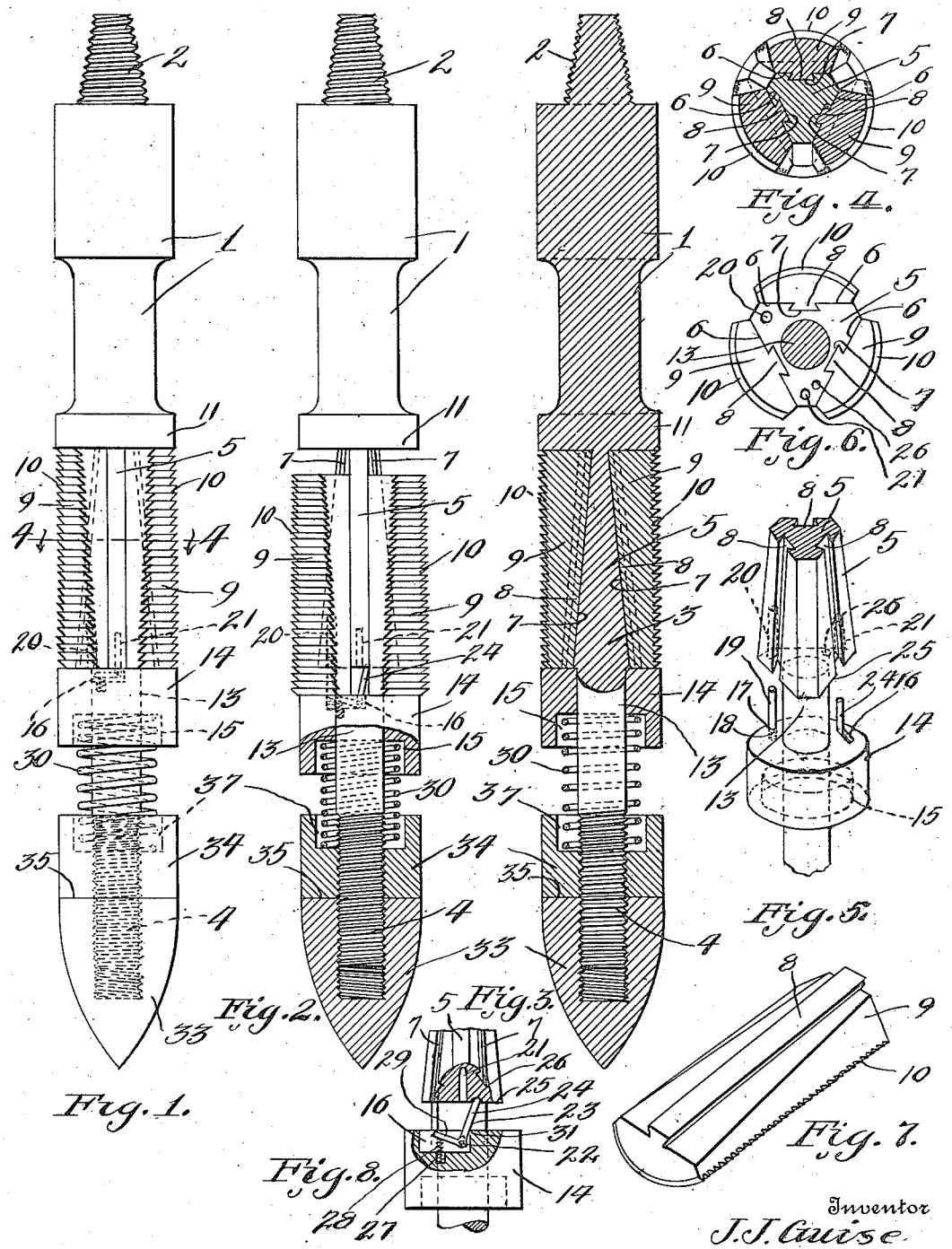

UNITED STATES PATENT OFFICE.

JACOB J. GUISE, OF PARKERSBURG, WEST VIRGINIA.

CASING-SPEAR.

1,144,592.     Specification of Letters Patent.     Patented June 29, 1915.

Application filed October 3, 1914. Serial No. 864,751.

*To all whom it may concern:*

Be it known that I, JACOB J. GUISE, a citizen of the United States, residing at Parkersburg, in the county of Wood and State of West Virginia, have invented a new and useful Casing-Spear; and I do hereby declare the following to be a full, clear, and exact description of the invention, such as will enable other skilled in the art to which it appertains to make and use the same.

This invention relates to an improved trip spear for removing or extracting casings from Artesian or oil wells.

As an object of the invention it is the aim to provide a spear having a contracted portion, which is substantially triangular in cross section, and with which a plurality of wedges having outer teeth coöperate, there being a wedge adjacent each face of the triangular portion (which is tapered) so that upon the initial upward movement of the spear, that is, after the same has been inserted in a casing of a well, the wedges will move outwardly, the teeth thereof biting into the inner circumference of the casing, and upon subsequent upward movement of the spear the casing will be extracted or removed.

One of the features of the invention is the provision of a spring tensioned collar for holding the wedges in their upward normal position upon the tapered triangular part, the collar being provided with a latch, which, when the collar is moved downwardly against the tension of the spring, will extract itself from a recess in the tapered triangular part and automatically seat itself in a depression of the triangular part adjacent said recess, for holding the collar so positioned that is, downwardly, whereby the wedges may also move downwardly, which wedges are provided with dove-tailed connections with the faces of said triangular part.

Another feature of the invention is the provision of a guiding device between the collar and the triangular solid portion of the spear.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in side elevation of the improved casing trip spear constructed in accordance with the invention, showing the toothed wedges in their normal position. Fig. 2 is a view in side elevation and partly in section showing the toothed wedges in their abnormal positions ready to engage the inner circumference of a casing. Fig. 3 is a longitudinal sectional view through the casing trip spear. Fig. 4 is a sectional view on line 4—4 of Fig. 1. Fig. 5 is a detail perspective view showing the trip collar and the tapered portion (which is triangular in cross section) of the spear, showing the means for guiding the collar and holding it spaced apart from the triangular part. Fig. 6 is a detail view of the triangular part, showing the dovetailed connections with the wedges. Fig. 7 is a detail view of one of the wedges. Fig. 8 is a detail view of the collar and a portion of the triangular part showing parts in section and illustrating the trip latch between the collar and the triangular part for holding the collar separated from the triangular part.

Referring more especially to the drawings, 1 designates the body as a whole, and 2 the tapered screw extension thereof designed for connection to any suitable device (not shown) of the usual character, whereby the spear may be lowered into the casing. Body is cut away to form an axially extending shank 3, the extreme lower end of which is provided with threads 4. The shank 3 is provided with a tapered part or portion 5, which is substantially triangular in cross section. Each face 6 of the triangular shaped part or portion is provided with a dove-tailed groove 7, to receive the dove-tailed rib 8 of each segmental wedge 9, the outer face of which is provided with teeth 10, which, when each wedge is allowed to move downwardly on the tapered portion from the shoulder 11 of the spear, engage the inner circumference of a casing to be extracted or withdrawn from an Artesian or other well.

Upon the reduced cylindrical portion 13

(which is between the threaded portion 4 and the tapered portion 5) of the shank 3 is a trip collar 14. One face of the collar 14 is provided with a hollowed out portion 15, the other face of the collar 14 is provided with an elongated recess 16 and a circular or annular recess 17. Threaded at 18 in the recess 17 is a guide lug or projection 19 entering a correspondingly shaped bore 20 of the triangular tapered part or portion 5, so that when the collar is moved upon the cylindrical part 13 of the shank, it is guided relative to the portion 5, that is, axially, and is prevented from moving partially annularly. The tapered part 5 is constructed with an additional cylindrical bore 21. Pivoted at 22 in the elongated recess 16 is an angular dog or trip member 23, the arm 24 of which is normally received in the bore 21, that is, when the collar 14 is in contact with the shoulder 25. Where the tapered part 5 adjoins the cylindrical part 13 of the shank, it is provided with a depression 26 adjacent the bore 21. In a counter recess 27 of the bottom of the recess 16 is a coil spring 28 bearing upwardly against the arm 29 of the angular trip dog 23, and when the collar 14 is moved downwardly against the action or tension of the spring 30 by manual means and sufficiently so that the arm 24 is free of the bore 21, the coil spring will kick or tilt the angular trip dog to the position shown in Fig. 8 and in contact with the shoulder 31, so that the free rounded end of the arm 24 will engage the depression 26 of the tapered part 5, thereby holding the collar 14 downwardly against the tension of the spring 30. In moving the collar 14 in this manner the guide member or projection 19 guides the collar axially with relation to the parts 5 and prevents the partial rotation of the collar. When the collar is in the position shown in Fig. 8, the segmental wedges 9 are free to move downwardly upon the downwardly diverging faces 6 of the part 5, especially when an upwardly pulling or raising force or action is imparted to the spear, thereby closing the teeth 10 of said wedges 9 to engage the inner circumference of a casing of an Artesian or oil well, whereby the casing may be extracted.

In lieu of using or employing a blunt nut on the threaded part 4, as is usually the case, the present spear is provided with a tapered pointed piercing member 33, whereby the top of the casing of the Artesian or other oil well may be swaged out to the required size very easily, whereas the blunt nut (which is usually employed) renders this function or feature hard or difficult.

A second collar 34 is threaded upon the threaded portion 4 of the shank and in contact with the tapered or pointed piercing member 33, as shown at 35, thereby assisting in locking the collar 34 and the member 33 in place. The collar 34 on one face is provided with a hollowed out portion 37, between which and the hollowed out portion or recess 15 the coil spring 30 is interposed. After a casing has been extracted or removed, and it is desired to restore or permit the wedges to assume their normal positions, a suitable tool may be inserted between the tapered portion 5 and the casing adjacent where the angular trip dog is positioned, and by a suitable manipulation of the tool the arm may be jarred from the depression 26, sufficiently to allow the arm 24 to enter the bore 21, the action of the spring 30 will then throw the collar upwardly, and restore the wedges to the positions shown in the Figs. 1 and 3. However, if it is desired to permit the wedges 9 to move farther downwardly than shown in Fig. 2, the collar 14 may be moved sufficiently to permit the projection 19 to be free of the bore 20, then by a slight partial rotary movement of the collar 14, the end of the projection 19 will engage the lower end wall or shoulder 25 of the tapered part 5. In permitting the wedges to be moved downwardly farther than that shown in Fig. 2, said wedges will engage the inner circumference of a slightly larger Artesian or oil well casing.

It will be observed that the threaded bore of the piercing or pointed member 33 is of sufficient length to permit of vertical adjustment upwardly or downwardly for regulating the tensioning of the spring 30.

The invention having been set forth, what is claimed as new and useful is:—

A casing trip spear comprising a body portion having its lower end reduced to form a shank having a shoulder, the lower end of the body above the shoulder being cut away to form a tapering part triangular in cross section, which tapering part is provided with downwardly diverging faces, wedges respectively mounted to slide longitudinally on said faces, a nut threaded on the shank, a piercing member threaded on the lower extremity of the shank below the nut and adjacent thereto, a collar forming an abutment for the wedges slidably mounted on the shank intermediate the shoulder and nut, a coil spring disposed around the shank intermediate the nut and the collar for urging the collar against the shoulder, said tapering part having a pair of elongated cylindrical recesses, a pin rigidly connected to one face of the collar and telescoping into one of said recesses of the tapered part to guide the collar, said collar having a depression, an angular trip member pivoted in said depression and provided with spring tensioning means, one of the arms of said angular trip member normally telescoping into the other recess of said tapered part, said shoulder having a depression adjacent one of the recesses to receive the recess engaging arm of the trip member when the collar moves downwardly to hold the collar separated from the shoulder.

In testimony whereof I have signed my name to this specification in the presence of two subscribing witnesses.

JACOB J. GUISE.

Witnesses:
J. W. VANDERVORT,
L. S. MARLOWE.